United States Patent
Ehnes et al.

(10) Patent No.: US 8,503,082 B2
(45) Date of Patent: Aug. 6, 2013

(54) OPTICAL FILM

(75) Inventors: Dale L. Ehnes, Cotati, CA (US); Mark E. Gardiner, Santa Rosa, CA (US); Alan B. Campbell, Santa Rosa, CA (US)

(73) Assignee: 3M Innovative Properties Company, Saint Paul, MN (US)

( * ) Notice: Subject to any disclaimer, the term of this patent is extended or adjusted under 35 U.S.C. 154(b) by 497 days.

(21) Appl. No.: 12/678,676

(22) PCT Filed: Jul. 25, 2008

(86) PCT No.: PCT/US2008/071122
§ 371 (c)(1),
(2), (4) Date: Oct. 26, 2010

(87) PCT Pub. No.: WO2009/042286
PCT Pub. Date: Apr. 2, 2009

(65) Prior Publication Data
US 2011/0032623 A1     Feb. 10, 2011

Related U.S. Application Data

(60) Provisional application No. 60/974,245, filed on Sep. 21, 2007.

(51) Int. Cl.
*G02B 27/10* (2006.01)

(52) U.S. Cl.
USPC .......................................................... 359/620

(58) Field of Classification Search
USPC ................ 359/618, 619, 620, 636; 362/355
See application file for complete search history.

(56) References Cited

U.S. PATENT DOCUMENTS

| | | |
|---|---|---|
| 5,919,551 A | 7/1999 | Cobb, Jr. |
| 6,354,709 B1 | 3/2002 | Campbell |
| 6,862,141 B2 | 3/2005 | Olczak |
| 7,072,092 B2 | 7/2006 | Olczak |
| 7,106,517 B2 | 9/2006 | Olczak |
| 7,675,682 B2 | 3/2010 | Lee |
| 2004/0120136 A1* | 6/2004 | Olczak et al. ................... 362/31 |
| 2005/0199501 A1 | 9/2005 | Olczak |

(Continued)

FOREIGN PATENT DOCUMENTS

| | | |
|---|---|---|
| JP | 2001-183642 | 7/2001 |
| JP | 2006-235111 | 9/2006 |

(Continued)

OTHER PUBLICATIONS

Written Opinion of the ISA for International Application No. PCT/US2008/071122, 9 pgs.

(Continued)

*Primary Examiner* — Joseph P Martinez
(74) *Attorney, Agent, or Firm* — Daniel J. Iden

(57) ABSTRACT

Optical films having anti-Moiré and anti-wetout features are described, along with systems and methods for making these optical films. A master used to make optical films is formed using a single axis actuator cutting along a trajectory that is out of plane with the surface of the master. Movement of the cutting tool along the trajectory cuts grooves having variable depth and variable pitch into the surface. Prisms formed from the master have variable depth, variable height prisms that provide anti-wetout and anti-Moiré features.

13 Claims, 11 Drawing Sheets

U.S. PATENT DOCUMENTS

| | | |
|---|---|---|
| 2005/0225865 A1 | 10/2005 | Olczak |
| 2006/0047358 A1 | 3/2006 | Liang |
| 2006/0109687 A1 | 5/2006 | Campbell |
| 2006/0226583 A1 | 10/2006 | Marushin |
| 2007/0097708 A1 | 5/2007 | Shim |
| 2007/0107568 A1 | 5/2007 | Campbell |
| 2007/0115569 A1 | 5/2007 | Tang |
| 2008/0225530 A1 | 9/2008 | Joo |

FOREIGN PATENT DOCUMENTS

| | | |
|---|---|---|
| JP | 2007-517256 | 6/2007 |
| KR | 10-0432347 | 5/2004 |
| KR | 10-2005-0092257 | 9/2005 |
| KR | 10-2008-0084559 | 9/2008 |
| KR | 10-2008-0092793 | 10/2008 |
| WO | WO 2005/069045 | 7/2005 |
| WO | WO 2007/019138 | 2/2007 |
| WO | WO 2007/058758 | 5/2007 |

OTHER PUBLICATIONS

International Search Report for PCT/US2008/071122; 5 pages.
U.S. Appl. No. 60/974,245, entitled "Optical Film", filed Sep. 21, 2007.

* cited by examiner

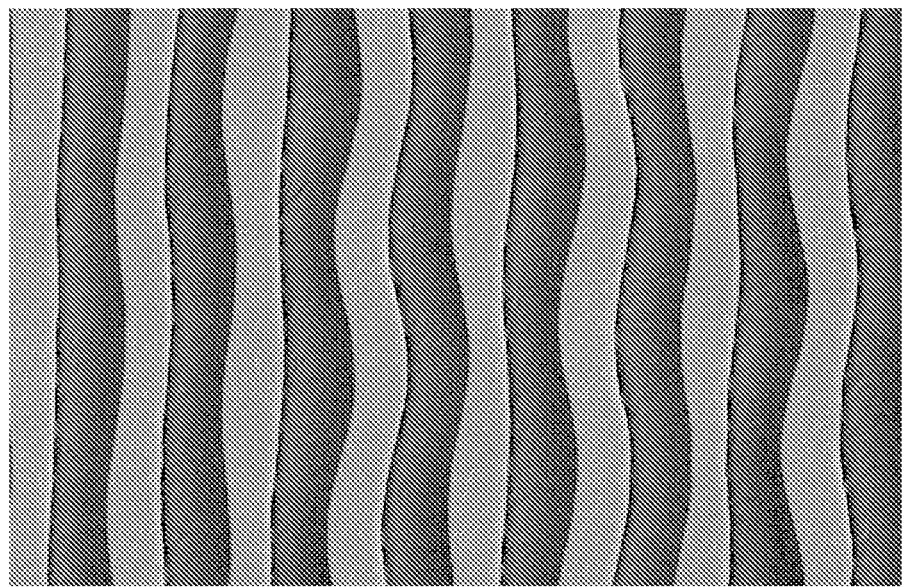
*Fig. 11A*  120 μm
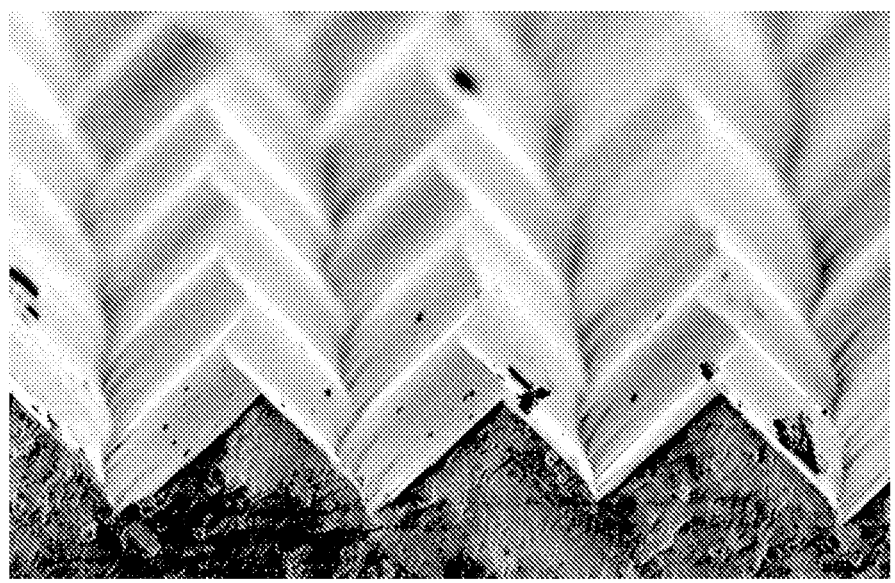
*Fig. 11B*  50 μm

*Fig. 11C*  12 μm

OPTICAL FILM

CROSS REFERENCE TO RELATED APPLICATIONS

This application is a national stage filing under 35 U.S.C. 371 of PCT/US2008/071122, filed on Jul. 25, 2008, which claims priority to U.S. Provisional Application No. 60/974,245, filed on Sep. 21, 2007, the disclosure of which is incorporated by reference in its/their entirety herein.

TECHNICAL FIELD

The present invention is related to optical films having anti-Moiré and anti-wetout features, and systems and methods for making optical films with anti-Moiré and anti-wetout features.

BACKGROUND

Optical films having prismatic structures are used to improve the appearance of displays. A display device may use several different types of films to enhance display brightness by directing light from the display light source along a preferred viewing angle.

Optical films increase desirable display characteristics such as brightness and contrast, but can also introduce undesirable characteristics. For example, overlaying multiple optical films in a display may result observable defects caused by wetout and/or Moiré effects.

There is a need for optical films that increase desirable characteristics of displays such as brightness and contrast while reducing defects that are distracting to the viewer. The present invention fulfills these and other needs, and offers other advantages over the prior art.

SUMMARY

Embodiments of the invention are directed to optical films having anti-Moiré and anti-wetout features, and systems and methods for making optical films with anti-Moiré and anti-wetout features.

One embodiment of the invention is a system for modifying a surface to produce a master for making optical films. The system includes a cutting tool used to cut grooves into the surface of the master. A drive mechanism provides relative motion between the cutting tool and the surface. A single axis actuator is coupled to move the cutting tool along a trajectory that is out-of-plane with the surface. The trajectory has a non-zero x-component, perpendicular to the surface, and a non-zero z-component, parallel to the surface. Movement of the cutting tool along the trajectory during the relative motion between the cutting tool and the surface cuts grooves having variable depth and variable pitch into the surface. In some configurations, the surface is cylindrical. In these configurations, the drive mechanism is configured to provide the relative motion between the cutting tool and the surface by rotating the cylindrical surface.

According to one aspect, the system includes a controller configured to generate a signal to produce non-random, random, or pseudo-random movement of the cutting tool.

The actuator may be a single axis piezoelectric actuator oriented with respect to the surface so that a direction of operation of the actuator is along the trajectory. The trajectory may have an angle in a range of about 1 degree to about 89 degrees or in a range of about 91 degrees to about 179 degrees relative to the plane of the surface. The variation in pitch and/or variation in depth can be in a range of about 0.5 microns to about 50 microns with a wavelength of about 5 microns to about 500 microns. The x and z components of the trajectory may be adjustable to achieve a desired amount of anti-wetout and anti-Moiré features in the film.

The drive mechanism may be arranged to move the cutting tool to produce a low frequency variation in groove pitch of about 0.5 microns to about 50 microns with a wavelength of about 500,000 microns. In this arrangement, the low frequency variation in pitch is superimposed on the variation caused by the movement of the cutting tool along the trajectory. Additionally or alternatively, the drive mechanism may be arranged to move the cutting tool to produce a low frequency variation in groove depth of about 0.5 microns to about 50 microns with a wavelength of about 2,000,000 microns. The low frequency variation in depth is superimposed on the variation caused by the movement of the cutting tool along the trajectory.

According to one aspect of the invention, the system may include a mechanism configured to orient the cutting tool tip geometry at an angle with respect to the surface. For example, the cutting tool tip geometry may be oriented substantially perpendicular to the surface. In one configuration, a spacer is disposed between the actuator and the cutting tool to provide the desired orientation.

Another embodiment of the invention involves a method of modifying a surface to produce a master for making optical films. As a cutting tool is moved across a surface, the cutting tool is also moved back and forth along a trajectory that has a non-zero x component, perpendicular to the surface, and a non-zero z-component, parallel to the surface. The movement of the cutting tool relative to the surface cuts grooves having variable pitch and variable depth into the surface. In one implementation, the surface is cylindrical and moving the tool across the surface includes thread cutting the grooves into the cylindrical surface.

In some implementations, the cutting tool movement cuts low frequency variations in groove pitch and/or groove depth that are superimposed on the variation produced by the movement of the cutting tool along the trajectory.

A further embodiment of the invention is directed to a master for making optical films. The master includes a surface with grooves in the surface. The grooves have varying pitch and varying depth. The variation in pitch has a range of about 0.5 microns to 50 microns with a wavelength of about 5 microns to about 500 microns and the variation in depth has a range of about 0.5 microns to about 50 microns with a wavelength of about 5 microns to about 500 microns. The variation in pitch is dependent on the variation in depth.

The variation in pitch and depth may be superimposed on one or both of a relatively lower frequency variation in pitch and a relatively lower frequency variation in depth.

Another embodiment of the invention is directed to a prismatic optical film, Each of the prisms of the film have variation in pitch and variation in height. The variation in pitch and the variation in height is in the range of about 0.5 microns to about 50 microns with a wavelength of about 5 microns to about 500 microns. The variation in pitch is dependent on the variation in height. The variation in pitch and height of the prisms may be superimposed on one or both of a relatively lower frequency variation in prism height and a relatively lower frequency variation in prism pitch.

In certain configurations, the prisms may be substantially linear and/or substantially parallel or the prisms may be intersecting. A first set of prisms may be interleaved with a second set of prisms, the first set having nominally greater height than the second set of the prisms. A first set of prisms having nominally greater pitch may be interleaved with a second set of prisms. For example, the interleaving may be 1 to 1 or may be according to another pattern.

Another embodiment of the invention is directed to an optical film that includes a substantially flat surface and a second surface having an array of prisms comprising a first group of prisms interleaved with a second group. Each of the prisms of a first group are substantially the same height and have variation in pitch in a range of about 0.5 microns to about 50 microns with a wavelength of about 5 to about 50 microns. The second group of the prisms have relatively greater height than the first group of the prisms. The prisms may be interleaved in a one to one pattern or may be interleaved in any other pattern. The variation in pitch of the first group of prisms may be random, pseudorandom, or non random. The second group of prisms may also have pitch and/or height variations.

A further embodiment of the invention is directed to a system for modifying a surface to produce a master for making optical films. A machine drive mechanism is configured to provide relative motion between a cutting tool and the surface. The machine drive mechanism is also configured to move the cutting tool perpendicular to the surface to cut grooves in the surface having a low frequency variation in depth of about 0.5 microns to about 50 microns. The system includes an actuator configured to move the cutting tool parallel to the surface to cut high frequency pitch variation in the grooves. The high frequency pitch variation has a range of about 0.5 microns to about 50 microns and a wavelength of about 5 microns to about 500 microns. The pitch variation maybe random, pseudorandom, or non-random.

Another embodiment of the invention involves a method of modifying a surface to form a master for making the optical films. A cutting tool is moved with low frequency to cut grooves in the surface. The grooves are cut with a low frequency variation in depth in range of about 0.5 microns to about 50 microns. The cutting tool is moved with high frequency to cut pitch variation in the grooves. The high frequency variation in pitch has a range of 0.5 microns to 50 microns with a wavelength of about 5 microns to about 500 microns. The high frequency variation in pitch may be random, pseudorandom, or non-random. The master may be used to form prisms on a film.

In another embodiment of the invention, a master for making an optical film includes a surface having grooves in the surface. Each groove has a high frequency variation in pitch in a range of 0.5 microns to 50 microns with a wavelength of about 5 to about 500 microns and a low frequency variation in depth in a range of 0.5 microns to 50 microns.

Another embodiment is directed to an optical film having a substantially flat surface and a second prismatic surface. The prisms of the second surface have prism peaks that lie in a plane substantially parallel to the flat surface. Each prism of a first group of the prisms have a high frequency variation in pitch in a range of about 0.5 microns to about 50 microns with a wavelength of about 5 microns to about 500 microns. Each prism of a second group of the prisms have a high frequency variation in height in a range of 0.5 microns to 50 microns with a wavelength of about 5 microns to about 500 microns. According to one aspect, the prisms of the first group are interleaved with the prisms of the second group, where the interleaving pattern may be one to one or another pattern.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

DESCRIPTION OF THE DRAWINGS

FIGS. 11A-11B are scanning electron micrographs illustrating prism films having substantially parallel prisms with variations in prism pitch and prism depth fabricated using a master formed by the trajectory cutting process in accordance with embodiments of the invention; and FIGS. 11C and 11D are scanning electron micrographs illustrating prism films with intersecting prisms having variations in prism pitch and prism depth fabricated using a master formed by the trajectory cutting process in accordance with embodiments of the invention.

Figure 1:
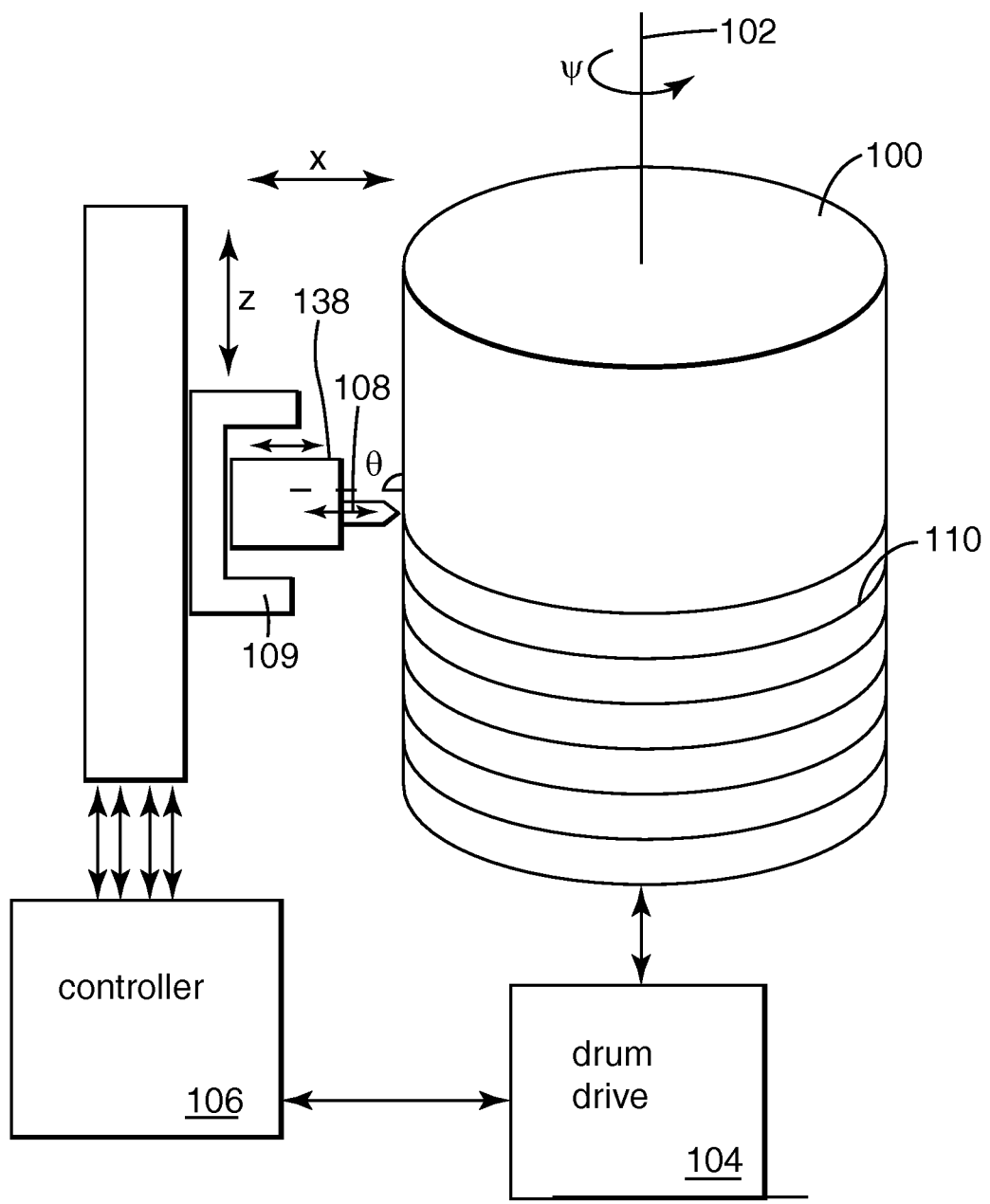
FIG. 1 illustrates a diamond turning machine system configured to manufacture a master roll used for fabricating prism films having anti-Moiré and anti-wetout features in accordance with embodiments of the invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, references are made to the accompanying drawings forming a part hereof, and in which are shown by way of illustration, various embodiments by which the invention may be practiced. It is to be understood that other embodiments may be utilized, and structural and functional changes may be made without departing from the scope of the present invention.

The use of films for displays is well known. For example, in backlit displays, brightness enhancement films use a prismatic structure to direct light along the viewing axis, thus enhancing the brightness of the light perceived by the viewer. As another example, a backlit computer display screen may use a number of different films in order to produce a screen with high contrast and high overall brightness, while simultaneously maintaining high, uniform brightness in certain selected directions and lower brightness in other directions. Such screens may use several types of films, including diffusing films in combination with a prismatic film or a lenticular film.

One problem with using films in a display is that the cosmetic requirements for a display intended for close viewing, such as a computer display, are very high. This is because such displays are viewed closely for long periods of time, and so even very small defects may be detected and cause distraction to the viewer. The elimination of such defects can be costly in both inspection time and in materials.

Defects are manifested in several different ways. There are physical defects such as specks, lint, scratches, inclusions etc., and also defects that are optical phenomena. Among the most common optical phenomena are "wet-out" and Newton's rings. "Wet-out" occurs when two surfaces optically contact each other, thus effectively removing the change in refractive index for light propagating from one film to the next. This is particularly problematic for films that use a structured surface for their optical effect, since the refractive properties of the structured surface are nullified. The effect of "wet-out" is to create a mottled and varying appearance to the screen. Newton's rings are the result of a slowly varying air gap between two films, as may be created by a particle of dust between two films. Newton's rings may be formed in transmission or in reflection. The result of Newton's rings is that the viewer perceives a contour pattern on the screen that may be distracting. Moiré effects are caused by optical interference patterns that can appear when two or more films having linear prisms of substantially equal pitch are overlaid. The defects described above give the display a non-uniform, mottled, or uneven look that is undesirable and distracting to the viewer.

Several approaches have been followed to overcome the problem of defects in multiple-film display assemblies. One is simply to accept a low yield of acceptable display assemblies produced by the conventional manufacturing process. This is obviously unacceptable in a competitive market. A second approach is to adopt very clean and careful manufacturing procedures, and impose rigid quality control standards. While this may improve the yield, the cost of production is increased to cover the cost of clean facilities and inspection.

Another approach to reducing defects is to introduce a diffuser to the display, either a surface diffuser or a bulk diffuser. Such diffusers may mask many defects, and increase the manufacturing yield at low additional cost. However, the diffuser scatters light and decreases the on-axis brightness of light perceived by the viewer, thus reducing the performance. There continues to be a need to reduce the occurrence of defects in displays, so that the manufacturing yield may be improved with little additional cost while, at the same time, maintaining performance.

Embodiments of the invention are directed to prism films that reduce the occurrence of observable defects in displays incorporating the films, and to methods and systems for making such films. The prism films formed according to the approaches described herein provide both anti-Moiré and anti-wetout features by varying the height and pitch of the prisms. Variation in the prism pitch reduces the appearance of Moiré interference patterns. Variation in prism height reduces the occurrence of wetout regions.

The prism films described herein are particularly useful in liquid crystal displays and are also useful in various types of projection screens, including overhead and rear projections screens. Prism films with anti-Moiré and anti-wetout features in accordance with the configurations described herein produce a number of unexpected and favorable results. For example, anti-wetout features occurring at the maximum excursion may be advantageously positioned equidistant to each other, providing more uniform support for the films. The ability to reduce defects and Moiré contrast is retained because variation in prism pitch is retained in the retracted peaks.

In some embodiments, a single axis out of plane motion is used to simultaneously form variations in peak and depth in prism master on a surface that was nominally in plane. Films fabricated from these masters having these features yield dramatic results in anti-wetout performance.

Masters used to manufacture prism films have prism features cut into the surface of the master in negative relief. After fabrication of the master, the master may be used to manufacture a prism film by embossing, extrusion, cast and cure, and/or other processes, for example.

Prism film masters are typically cylindrical rolls having grooves that are the negative of the desired prism shapes. The grooves may be cut into the master by diamond turning. The surface of the master is typically of hard copper, although other materials such as aluminum, nickel, steel, or plastics (e.g., acrylics) may also be used. A number of concentric grooves may be cut around the circumference of the master roll. The master roll may be machined by a technique known as thread cutting, in which a single, continuous cut is made in the roll while the diamond tool is moved in a direction parallel to the surface of the rotating master roll, or plunge cutting where a plurality of concentric grooves are individually formed in the workpiece.

A diamond turning machine typically includes a controller that controls the movement of a cutting tool used to cut grooves in the master. The diamond turning machine may independently control the depth that the cutting tool penetrates into the master and the lateral motion of the tool along the surface of the master. Additionally, the diamond turning machine may independently control the rotational speed of the cylindrical master.

A diamond turning system configured to manufacture a master roll used for manufacturing prism films is illustrated in FIG. 1. A cylindrical master 100 is rotated around an axis 102 by a drum drive 104. Although, in this example, the master 100 is shown in cylindrical form, in alternative configurations, the master can be planar. An anti-wetout, anti-Moiré surface pattern may be cut into the master 100 by cutting plunge cutting concentric grooves or by thread cutting a shallow groove 110 on the master 100, i.e. translating the cutting tool 108 in the z-direction while cutting into the surface of the master 100. Because the surface of the master 100 forms the complementary surface of the film, local minima on the master surface correspond to local maxima on the film surface when the film is fabricated.

Typically, a controller 106 drives the cutting tool mount 109 laterally in the z-direction to move the cutting tool 108 along the rotating master 100 to make a continuous, threaded cut, or discontinuous concentric cuts. The controller 106 controls the speed of the drum drive 104 and may monitor the angular position, Ψ, of the master 100.

The controller 106 controls the movement of the cutting tool mount 109 to produce low frequency excursions of the cutting tool in the z-direction, parallel to the master surface, and to produce low frequency excursions of the cutting tool in the x-direction, normal to the surface of the master. The controller 106 may also control the movement of the cutting tool 108 via one or more fast servo actuators 138 to produce high frequency excursions of the cutting tool. The angle, θ, between the cutting tool 108 and the master surface 100 can also be controlled. The size and shape of the cutting tool 108 are selected depending on the particular type of film that the master 100 is to be used to manufacture.

Movement of the one or more actuators 138 are used to produce short, fast excursions of the cutting tool 108, while movement of the cutting tool mount 109 is used to produce longer, slower excursions of the cutting tool 108. The low frequency motion of the mount may be used to vary the surface cut in the master 100 by an amount greater than the stroke length of the fast servo actuators 138. The controller 106 generates control signals that control the high and low frequency movements of the cutting tool 108. The control signals may include a low frequency component directed to the cutting tool mount 109 and a high frequency component directed to the actuators 138.

The high and/or low frequency components of the control signal may be synchronous to the rotation of the master 100 and may be a periodic, random, non-random, or pseudo-random. For example, movement of the one or more actuators 138 may be controlled to make small, rapid movements of the cutting tool 108 during movement of the mount 109 which is controlled to make larger, slower movements of the cutting tool 108. As such, the higher frequency movement of the cutting tool 108 produced by the actuator 138 is superimposed on the lower frequency movement of the cutting tool 108 produced by the mount 109. The movement of the mount 109 and/of the actuator 138 may be random, pseudo-random, or non-random. Pseudo-random movement may be achieved by computer generated randomness. It may be preferred to repeat the same random signal for each roll tool, such that they contain the same recorded randomness and the resultant structure is same roll to roll. In some embodiments, the movement of the actuator 138 and/or tool mount 109 may be generally non-random, such as a periodic or sinusoidal pattern, which is randomized by a sporadic random movement that cause a phase shift in the pitch or depth pattern of the grooves 110.

The one or more actuators 138 operate to move the cutting tool 108 at high frequencies not normally obtainable by movement of the cutting tool mount 107. Each actuator 138 comprises a single axis fast tool servo, having a transducer, such as a piezoelectric transducer (PZT), or other transducer for converting an electrical signal from the controller 106 into movement of the actuator 138 which ultimately controls the motion of the cutting tool 108. The upper frequency limit of the fast servo actuator's response may lie in the range from several kilohertz to many tens of kilohertz, whereas the frequency response of the cutting tool mount is typically not greater than 5 Hz. For example, movement of the tool mount 109 may achieve a low frequency variation in groove pitch of about 0.5 microns to about 50 microns over a distance (wavelength) of about 500,000 microns. Movement of the tool mount 109 may achieve a low frequency variation in groove depth of about 0.5 microns to about 50 microns with a wavelength of about 2,000,000 microns.

The length of the stroke that the actuator 138 produces may be, for example, less than 50 microns, or in a range of about 0.5 micron to about 50 microns with a wavelength of about 5 microns to about 500 microns. This range of higher frequency variations may be employed to provide enhanced defect-hiding and light scattering. In embodiments where a wide viewing angle is desirable, the finer pitch softens and smoothens the cutoff angle of the display, for example. It will be appreciated that there may be a trade-off between length of stroke and upper frequency response.

The resulting grooves 110 cut on the surface of the master 100 have an average spacing between local x and/or z excursions around the roll circumference that is dependent on the surface speed of the roll relative to the cutting tool 108, and the average period of time between excursions of the cutting tool 108. For example, a drum having a diameter of 12 inches may be rotated at 200 revolutions per minute, while actuator 138 drives a tool sinusoidally at about 20 Khz. The resultant wavelength will be 160 microns in the plane of the actuation vector.

Figure 2:
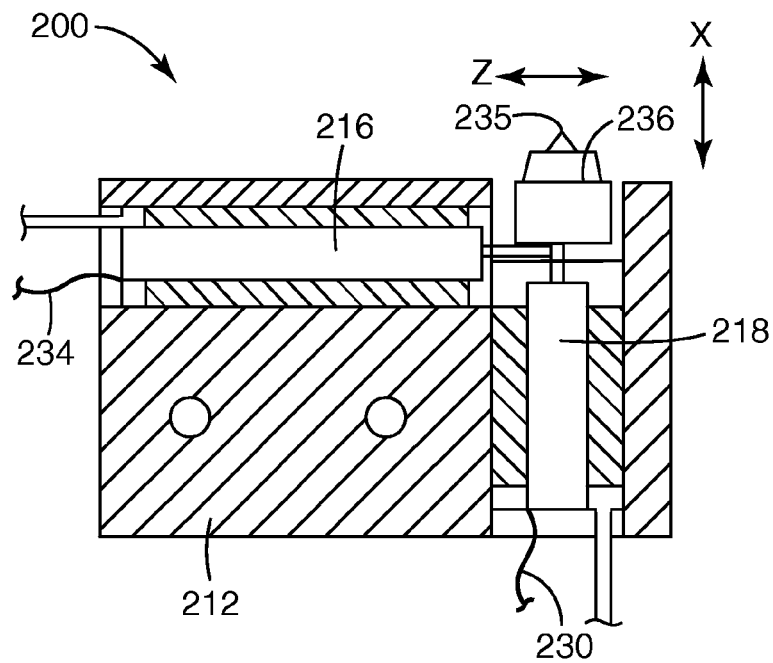
FIG. 2 provides a top view of a portion of a tool mount assembly configured to mount a cutting tool and dual single axis actuators to a diamond turning machine for producing a master roll.

FIG. 2 provides a top view of a portion of a tool mount assembly 200 that is used to mount a cutting tool 236 and actuators 218, 216 to a diamond turning machine. The tool mount assembly 200 includes a main body 212 capable holding a single axis x-direction actuator 218, a single axis z-direction actuator 216, and the cutting tool 236. In this example, the actuators 216, 218 are PZT stacks. The PZT stacks 218, 216 are arranged to move the cutting tool 236 in the x-direction and z-direction, respectively. The PZT stacks 218, 216 are securely mounted to the tool mount assembly 212 for the stability required for precise controlled movement of cutting tool 236. PZT stacks 218, 216 include electrical connections 230, 234 for receiving signals from the controller.

The cutting tool tip 235 may be oriented perpendicular to the surface of the master roll. Movement of cutting tool under control of the x-axis actuator 218 as the master rotates causes parallel grooves of variable depth to be cut into the master. Movement of the cutting tool under control of the z-direction actuator 216 as the master roll rotates causes grooves of variable pitch to be cut into the master roll. In some configurations, the grooves may be substantially linear and substantially parallel at least for some distance. In some embodiments, the grooves may intersect.

A cutting tool assembly having independent x and z movements for use in making prism films is described in commonly owned U.S. Patent Publication 2007/0107568 which is incorporated herein by reference.

An embodiment of the invention is directed to systems and methods for making a prism film master that uses only one single axial actuator to control the movement of the cutting tool. The use of a single axis actuator may be used to cut grooves that have interdependent x and z components.

The cutting tool is oriented with respect to the master so that operation of the single axis actuator causes the cutting tool to move along a trajectory that has both an x-component and a z-component to produce a cutting tool motion that is out of plane with the surface of the master. The out of plane movement of the cutting tool cuts grooves in the master roll that have variations in both groove depth and pitch. When the prism film is made using the master roll, the variable pitch, variable depth grooves in the master translate to variable pitch, variable height prisms. As previously discussed, the variable pitch, variable height prisms provide anti-Moiré and anti-wetout features in the prism film.

The operation of one single axis actuator can produce a linear motion of the cutting tool to cut a groove having both depth and pitch variations. The use of a single axis actuator reduces the number of components needed, simplifies the construction of the tool mount, simplifies the controller electronics, increases the speed at which the structured films can be produced, and fabricates a master tool having both anti-Moiré and anti-wetout prism features. The variation in pitch achievable using the single axis actuator is less than about 0.5 to about 50 microns variation in pitch with a wavelength of about 5 to about 500 microns. The variation in depth achievable using the single axis actuator is less than about 0.5 to about 50 microns variation in depth with a wavelength of about 5 to about 500 microns.

Figure 3A:
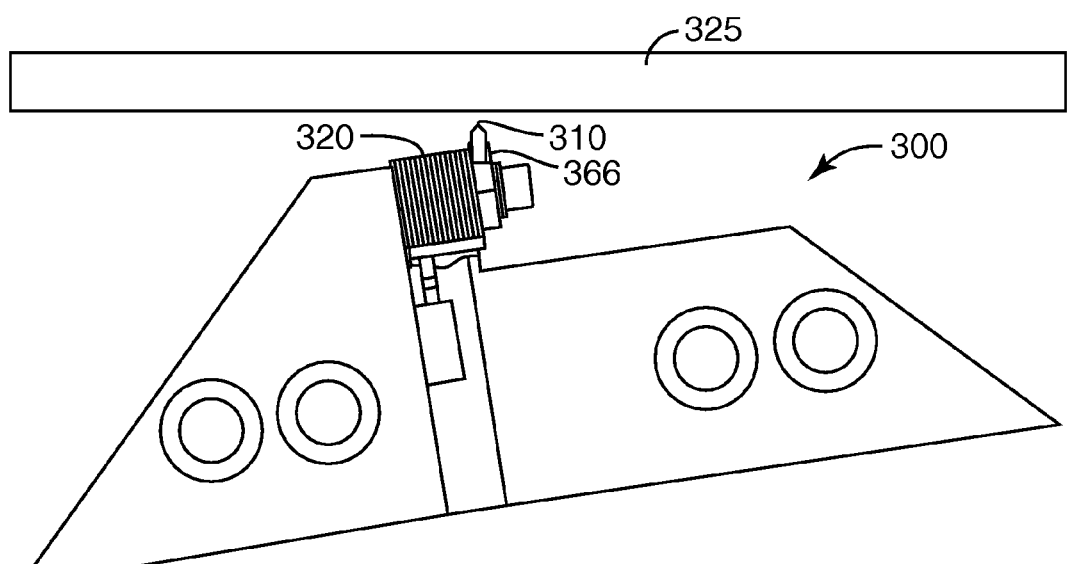
FIG. 3A shows a portion of a tool mount configured to mount a cutting tool and a single axis actuator to a diamond turning machine in accordance with embodiments of the invention.

FIG. 3A shows a portion of a tool mount 300 configured to mount a cutting tool 310 and a single axis actuator 320 to a diamond turning machine. The cutting tool 310 and the actuator 320 are oriented so that operation of the actuator 320 (e.g., a PZT actuator) produces an off-axis motion of the cutting tool 310. Operation of the PZT actuator 320 moves the cutting tool 310 along a trajectory that has both x and z components and is off axis with the surface of the master 325.

Figure 3B:
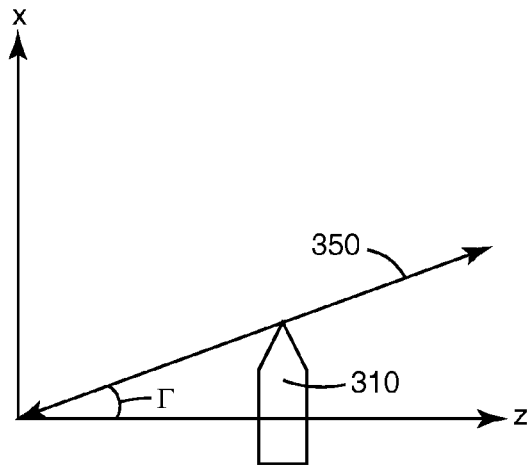
FIG. 3B illustrates the trajectory of the cutting tool in the X-Z plane for the single axis actuator arrangement as shown in FIG. 3A.

FIG. 3B illustrates the trajectory 350 of the cutting tool 310 in the X-Z plane for the single axis actuator arrangement as shown in FIG. 3A. The cutting tool 310 moves back and forth along the trajectory 350 to cut variable depth and variable pitch grooves in the master. The trajectory 350 can be tuned for a single axis actuator depending on the amount of x component and z component desired. The maximum hypotenuse length is dictated by the single axis actuator travel capability.

For example, a PZT stack capable of 20 microns of travel, the actuator could be rotated such that 3 microns of anti-wetout variation (x-axis component) is desired. With the x axis component equal to 3 microns, and the hypotenuse equal to 20 microns, then the actuator is oriented with respect to the master surface at an angle, Γ, of 8.6 degrees. Using the Pythagorean theorem, the anti-Moiré component along the z-axis is calculated to be 19.7 microns.

Figure 3C:
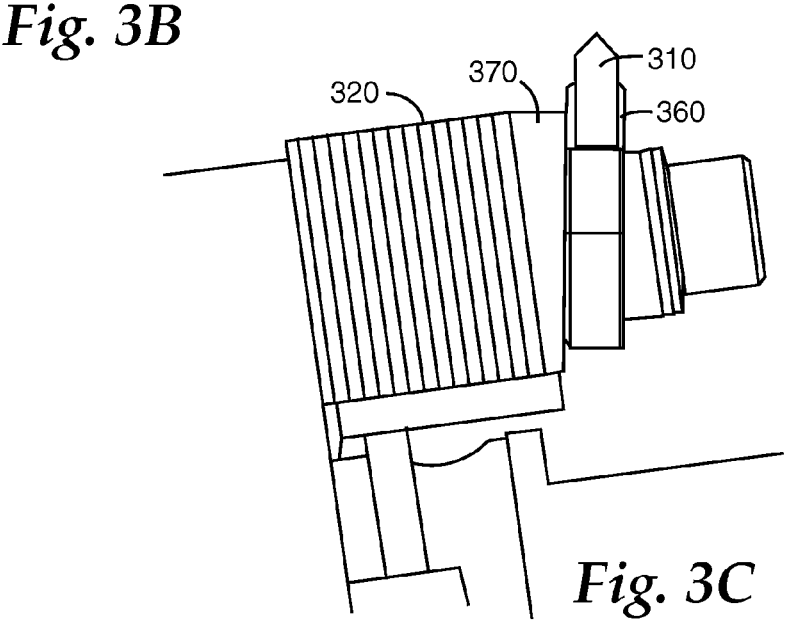
FIG. 3C illustrates a spacer mounted between the actuator and the cutting tool which is used to maintain the angle of the cutting tool tip substantially perpendicular to the surface of the master roll in accordance with embodiments of the invention.
Figure 3D:
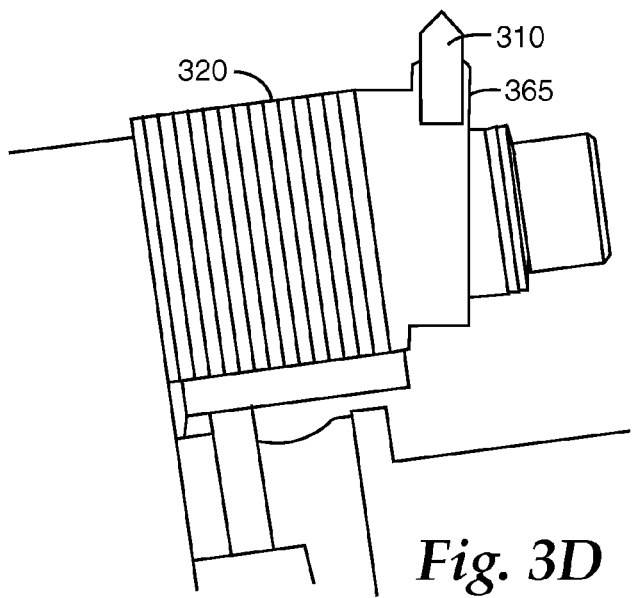
FIG. 3D illustrates a tool shank for mounting a cutting tool to maintain the angle of the cutting tool tip substantially perpendicular to the surface of the master roll in accordance with embodiments of the invention.
Figure 3E:
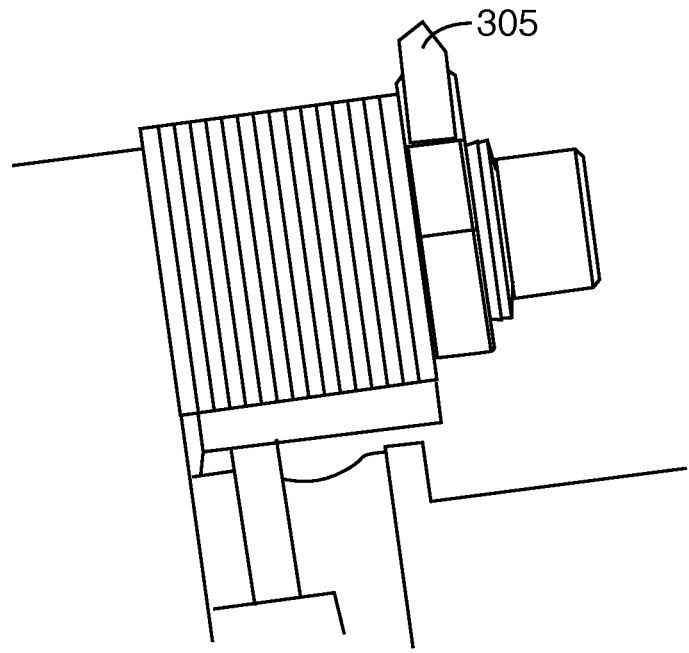
FIG. 3E illustrates a cutting tool lapped to provide a cutting tool tip that is substantially perpendicular to the surface of the master roll in accordance with embodiments of the invention.

The tip of the cutting tool 310 may be oriented perpendicular to the surface of the master or may be oriented at an angle to the master surface. The tool tip orientation may be achieved many ways. As illustrated in FIG. 3C, an orienting spacer 370 may be employed between the PZT actuator 320 and tool shank 360. As illustrated in FIG. 3D, the tool shank 365 may include the desired geometry directly. The tool 310 may be oriented on the shank 366 at the desired angle, as illustrated in FIG. 3A. The tool tip 305 may be lapped or formed to contain the desired orientation as shown in FIG. 3E.

Figure 4:
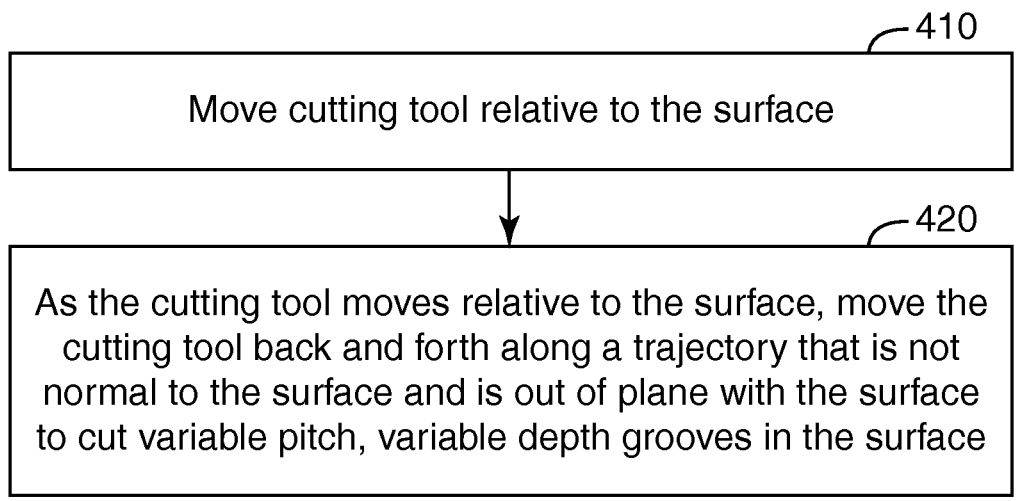
FIG. 4 is a flow diagram illustrating a method of cutting a master used to fabricate anti-Moiré, anti-wetout prism films in accordance with embodiments of the invention.

FIG. 4 is a flow diagram illustrating a method of cutting a master used to fabricate anti-Moiré, anti-wetout prism films in accordance with embodiments of the invention. The cutting tool is moved 410 relative to the surface of the master to cut grooves in the surface. The movement of the cutting tool relative to the surface may produce thread cutting of a groove in the surface of the master or cutting concentric grooves. As the cutting tool is moved relative to the surface, it is also moved 420 via a single axis fast servo actuator back and forth along a trajectory that has non-zero x and z components and is out-of-plane with the surface. Movement of the cutting tool along the trajectory causes the grooves cut in the surface to have both variable pitch and variable depth.

Figure 5:
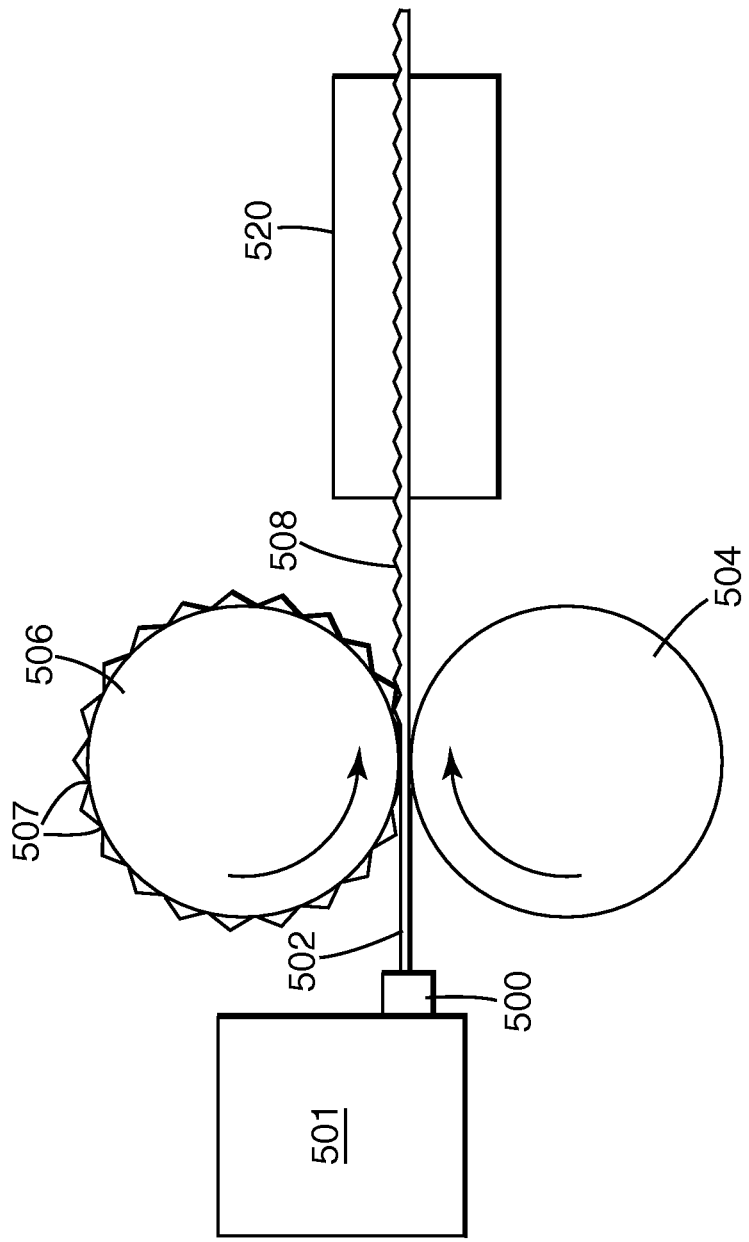
FIG. 5 illustrates a system for fabricating a prism film having anti-Moiré and anti-wetout features using the master roll in accordance with embodiments of the invention.

A prism film having anti-Moiré and anti-wetout features may be formed by casting between a pair of rollers that are spaced apart by a specific dimension, as illustrated in FIG. 5. In FIG. 5, a film 502 is pulled from a reservoir 501, through a die 500. The film 502 is nipped between a nip roll 504 and a master roll 506 bearing grooves 507 that are the negative of desired prism structures. The master roll 506 forms the prism pattern 508 onto the upper surface of the film 502. After passing between the rollers 504 and 506, the film 502 cools, for example, in a cooler 520, and maintains the patterns embossed on it by the rollers 504 and 506.

In one prism film embodiment, the master roll 506 bears grooves 507 cut by high frequency excursions of the cutting tool along a trajectory that has non-zero x and z components that is out of plane with the surface of the master roll. The prisms formed by the master roll 506 may have random, pseudo-random, or non-random variations in pitch to provide anti-Moiré features and/or may have corresponding random, pseudo-random, or non-random variations in height to provide anti-wetout features. For example, the variation in prism height and pitch may have a range of about 0.5 microns to about 50 microns with a wavelength of about 500 microns.

Figure 6A:
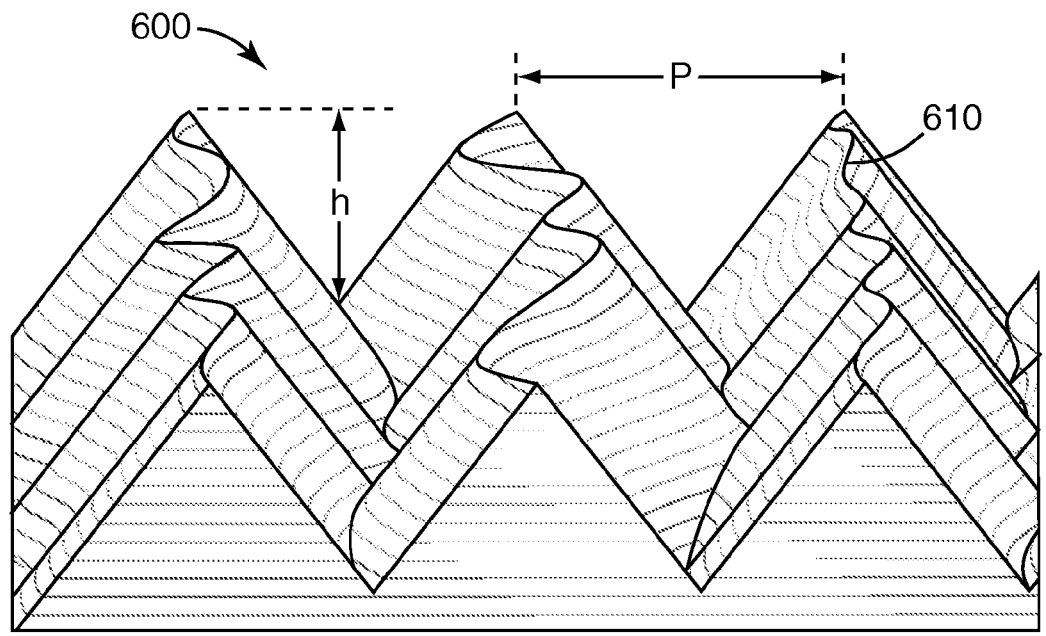
FIGS. 6A and 6B are perspective and cross-sectional views, respectively, illustrating a prism film fabricated using a master roll having x and z-axis excursions formed by cutting along an out of plane trajectory in accordance with embodiments of the invention.
Figure 6B:
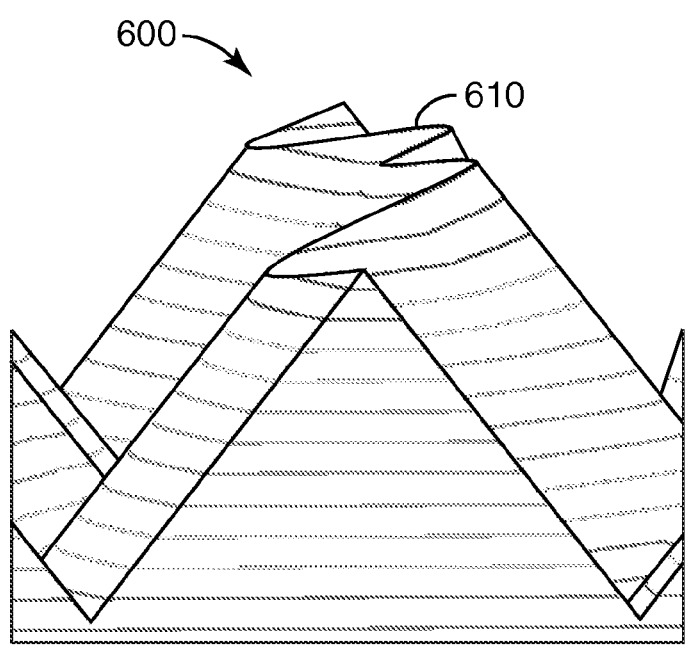
Figure 6C:
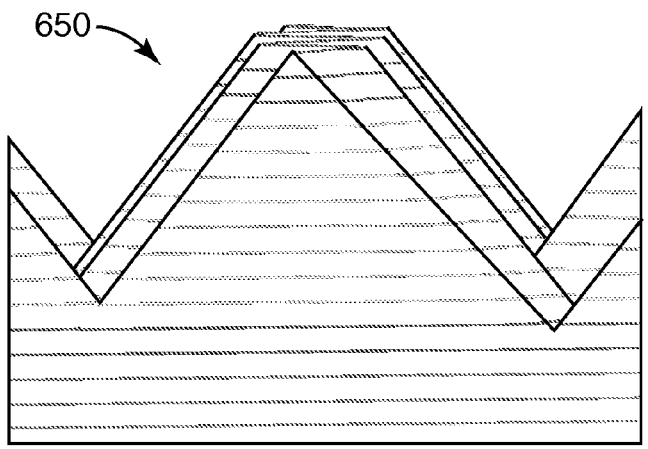
FIG. 6C is a cross-sectional view of a prism film having only pitch variations without height variations.

FIG. 6A illustrates a prism film 600 formed using a master roll having x and z-axis excursions formed by cutting along an out of plane trajectory. The lines depicted on the prism films of FIGS. 6A-6C are intended to more clearly illustrate height variations of the prisms. The prism film 600 includes prisms 610 having both anti-Moiré variations in prism pitch, p, and anti-wetout variations in prism height, h. FIG. 6B is a cross-sectional view of the prism peaks 610 of the prism film 600 of FIG. 6A illustrating the variations in prism height and pitch. For comparison, FIG. 6C is a cross-sectional view of a prism film 650 having prisms with only pitch variations without height variations.

Figure 7A:
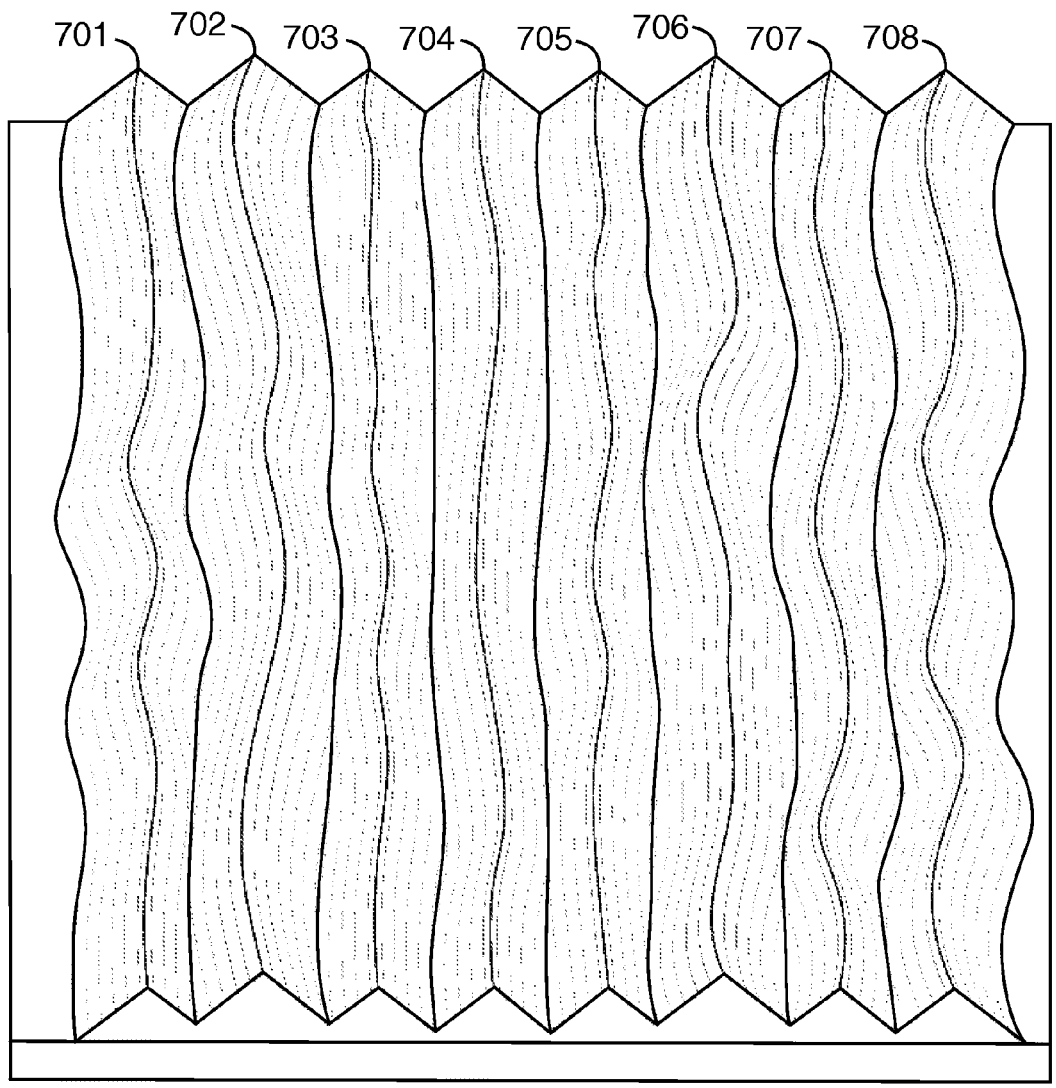
FIGS. 7A and 7B are perspective and cross-sectional views of a prism film having prisms with high frequency variations in pitch to provide anti-Moiré features where some prisms having greater nominal height than neighboring prisms to provide anti-wetout features in accordance with embodiments of the invention.
Figure 7B:
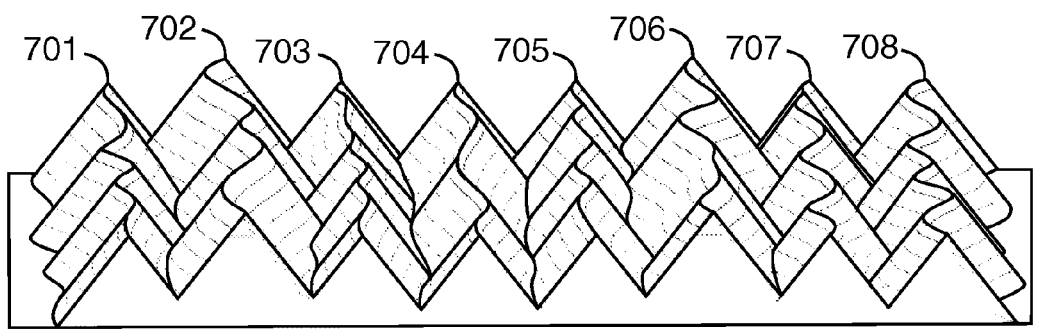

In another prism film embodiment, the master roll bears grooves cut by high frequency motion of the cutting tool controlled by one single axis fast servo actuator coupled with low frequency x-axis motion of the cutting tool. The single axis actuator may be a z-axis actuator or a single axis actuator providing out of plane x and z motion as illustrated in FIG. 3A. The prism film includes prisms having high frequency variations in pitch to provide anti-Moiré features where some of the prisms have greater nominal height than neighboring prisms to provide anti-wetout features. One example of this type of prism film is illustrated by the top and cross sectional views of FIGS. 7A and 7B, respectively. In FIG. 7A, prisms 701-708 exhibit variations in prism pitch. The nominal height of prisms 702 and 706 is greater than the nominal height of prisms 701, 703-705, 707, and 708. The lines depicted on the prism films of FIGS. 7A and 7B are intended to more clearly illustrate height variations of the prisms.

Figure 8:
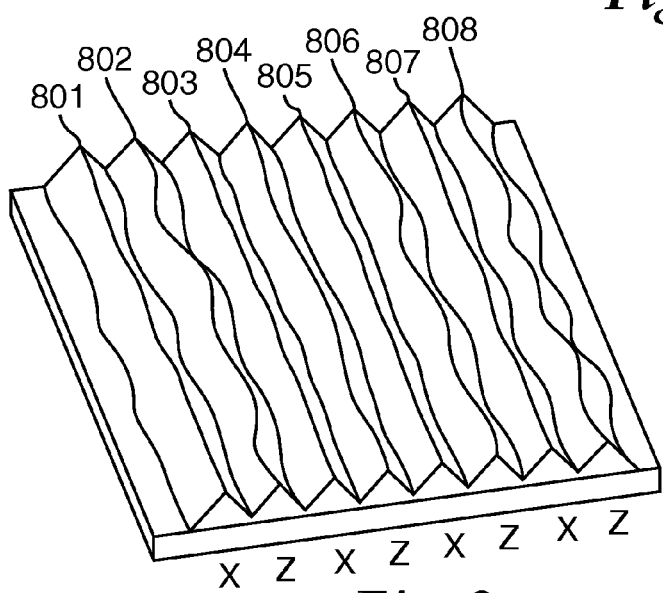
FIG. 8 illustrates a prism having prisms with high frequency variations in height to provide anti-wetout which are interleaved with prisms having high frequency variations in pitch to provide anti-Moiré features in accordance with embodiments of the invention.

In yet another prism film embodiment, the master roll bears a first set of grooves cut by high frequency z-axis motion of the cutting tool controlled by the z-axis actuator. The first set of grooves is interleaved with second set of grooves cut by high frequency motion of the cutting tool controlled by the x-axis actuator. For example, the master roll may have m grooves having z-axis variations interleaved with n grooves having x-axis variations. FIG. 8 illustrates a prism film formed using such a master roll, where m and n=1. Prisms 801, 803, 805, 807 have high frequency variations in height to provide anti-wetout. The anti-wetout prisms 801, 803, 805, 807 are interleaved with prisms 802, 804, 806, 808 having high frequency variations in pitch that provide anti-Moiré features.

Figure 9:
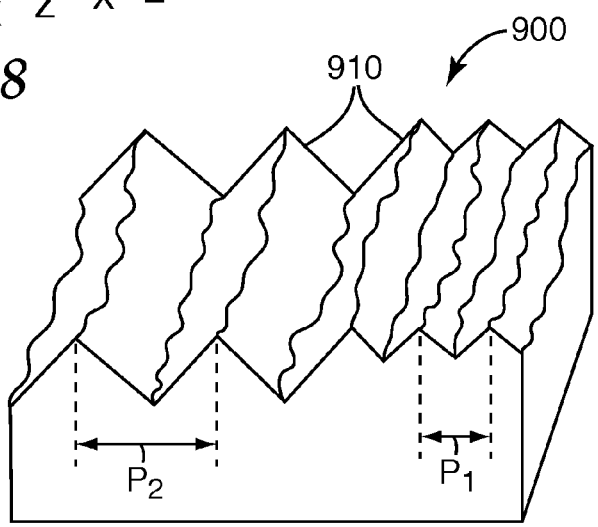
FIG. 9 illustrates a prism film having gradual variation in the nominal pitch of the prisms along with high frequency variations in prism height and pitch in accordance with embodiments of the invention.

In a further prism film embodiment, the grooves cut into the master roll include low frequency prism-to-prism pitch variations superimposed on high frequency pitch and depth variations formed by a single axis actuator providing cutting tool movement along a trajectory out of plane with the master roll surface. FIG. 9 illustrates a prism film 900 formed using this type of master roll. The nominal pitch of the prisms 910 varies gradually from prism to prism, such that the pitch, $P_1$, between some prisms is smaller than the pitch, $P_2$, between other prisms. Each prism 910 also includes high frequency variations in height and pitch corresponding to variations in pitch and depth cut by the fast motion of the cutting along the trajectory out of plane with the master surface as discussed above. Additional details regarding variable pitch prism films and method and systems for making such films is described in commonly owned U.S. Pat. No. 5,919,551 which is incorporated herein by reference.

Films fabricated according to the present invention are preferably made of a substantially transparent material. Bulk diffusion material may be incorporated in a film according to the invention, although in many cases this may degrade the performance of the optical film. In addition, multiple layers of film and material may be included in a single film in order to produce a specific optical effect, such as a reflective polarization. Acrylics and polycarbonates are good candidates for film materials. Also, the film may be a two-part construction where the structured surface is cast and cured on a substrate. For example, ultraviolet cured acrylics cast on polyester substrates may be used. Films of polyethylene terphthalate (PET) have been shown to work well as substrates on which structures may be cured. Polyethylene naphthalate (PEN) has also been shown to work well as a polymeric material for manufacturing optical films.

Figure 10:
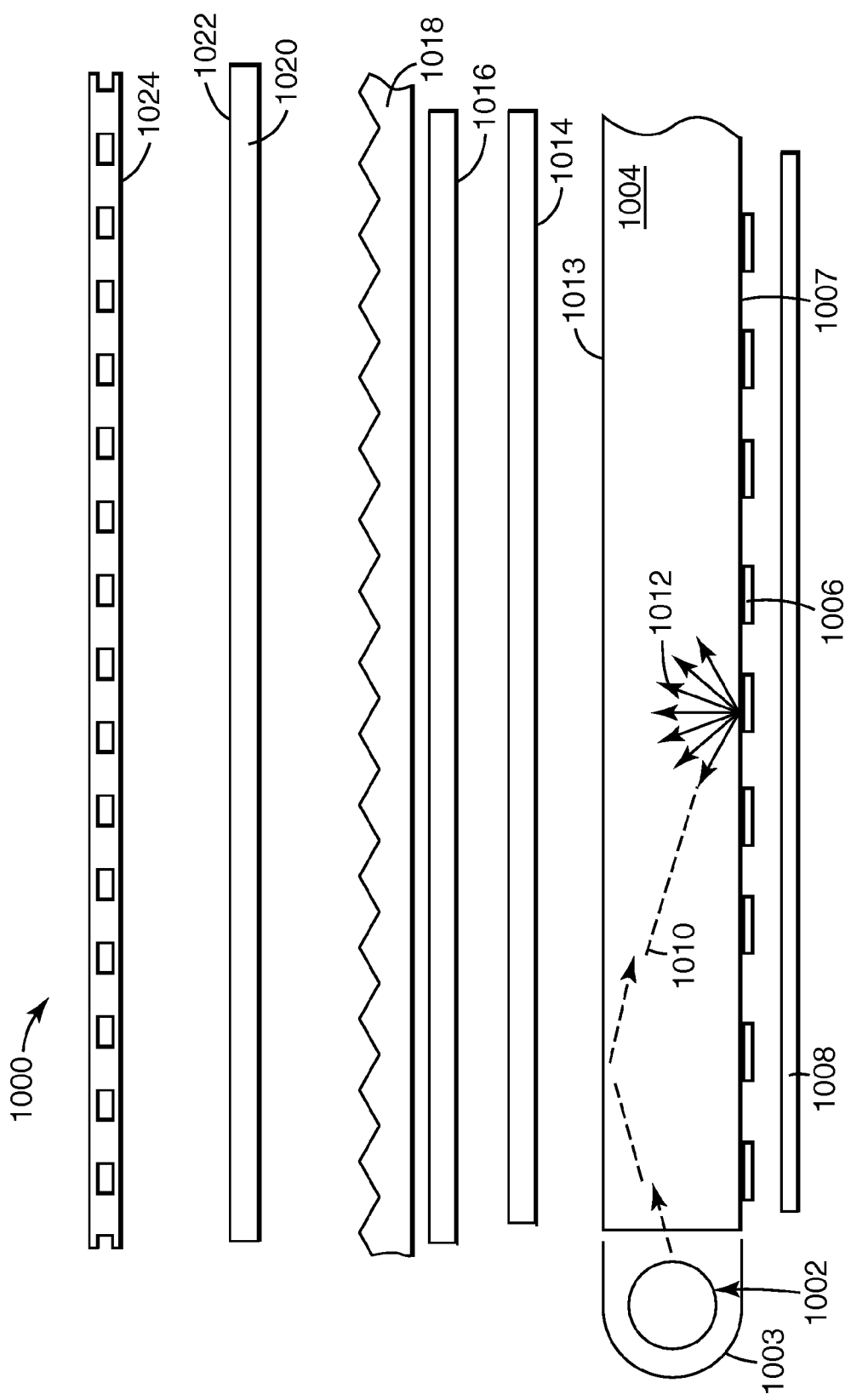
FIG. 10 shows an example of an apparatus using a film having an anti-wetout, anti-Moiré surface in accordance with embodiments of the invention.

One example of an apparatus using a film having an anti-wetout, anti-Moiré surface is illustrated in an exploded view in FIG. 10. A liquid crystal display (LCD) illumination module 1000 uses a fluorescent lamp 1002 and reflector 1003 as a light source to direct light into a light guide 1004. The light guide 1004 may have diffusely reflecting extraction dots 1006 on the lower surface 1007. A broadband, diffuse reflector 1008 is positioned below the light guide 1004 to reflect any light recycled from any components above the guide 1004. Light from the fluorescent lamp 1002 enters the side of the light guide 1004 and is guided along the light guide 1004 via internal reflection at the surfaces of the guide 1004. A light ray 1010 incident on one of the extraction dots 1006 is diffusely reflected to produce a number of diffusive rays 1012.

Light propagating upwards from the extraction dots 1006 passes through the upper surface 1013 of the guide 1004. A diffuser 1014 may be positioned above the light guide 1004 to further diffuse light extracted from the guide 1004, and thus make the subsequent illumination of an LCD display 1024 more uniform.

Light continuing in an upwards direction may then pass through a upper and lower prism films 1018, 1016, each having a prismatic structure on an upper surface similar to the prismatic structures described herein. The films 1018, 1016 are arranged so that the prism axis of the upper film 1018 is oriented at an angle, such as about 90 degrees, with respect to the prism axis of the lower film 1016. Light is recycled by either the upper or lower prism films 1018, 1016 to be reflected by the reflector 1008. The pair of crossed films 1016, 1018 serves to direct the light output along a preferred viewing axis.

A reflective polarizing film 1020 is positioned above the upper film 1018. The reflective polarizer 1020 transmits light of one polarization and reflects light of an orthogonal polarization. Therefore, the light passing through the polarizing film 1020 is polarized. The light reflected by the polarizing film 1020 may be recirculated by the reflector 1008.

An LCD matrix 1024 is positioned above the polarizing film 1020. Polarized light passing through the LCD matrix is spatially modulated with information, for example an image, which is then transmitted. Other components may be included in the module 1000, such as a cover sheet between the upper film 1018 and the polarizing film 1020.

Backlit LCD displays as illustrated in FIG. 10 may be incorporated in various devices, including televisions, computer monitors, portable gaming devices and cell phones, for example.

Figure 11D:
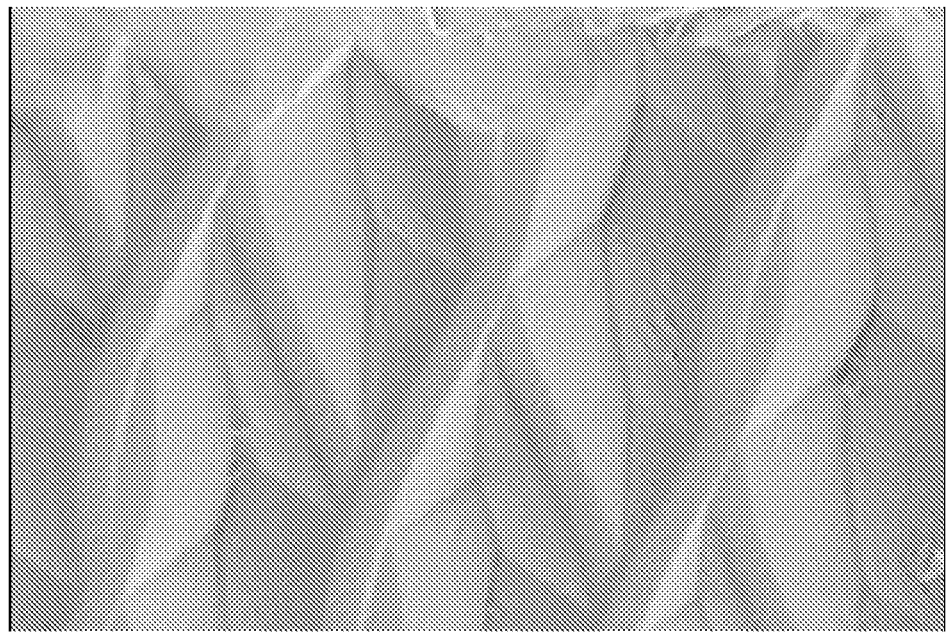
Figure 11D:
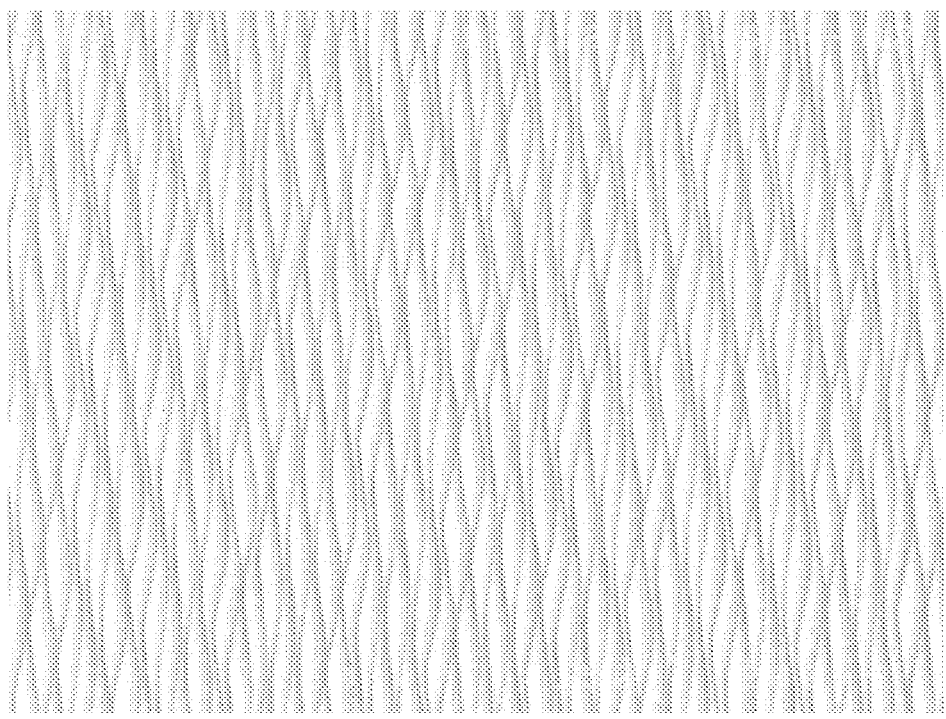

FIGS. 11A-11C provide micrographs of prism films formed in accordance with the processes described herein. FIGS. 11A and 11B, respectively, illustrate top and cross sectional view of a prism film formed from a master produced by the trajectory cutting process as described in connection with FIGS. 3 and 4. FIGS. 11A and 11B show substantially linear, substantially parallel prisms with variations in height and pitch. FIG. 11C shows intersecting prisms formed by the trajectory cutting process. FIG. 11D shows another configuration of an intersecting prism film made by the trajectory cutting process.

Various configurations of films having prisms with anti-Moiré pitch variations and anti-wetout height variations have been illustrated above. It will be appreciated that the various prism structures described may be used in any combination to provide defect reducing films. For example, high frequency x and/or z variations may be used in any combination with low frequency x and/or z variations to provide prism films that provide anti-Moiré, anti-wetout films.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for modifying a surface to produce a master for making optical films, the system comprising:
   a cutting tool;
   a drive mechanism configured to provide relative motion between the cutting tool and the surface; and
   a single axis actuator coupled to move the cutting tool along a trajectory that is out-of-plane with the surface, the trajectory having a non-zero x-component, perpendicular to the surface, and a non-zero z-component, parallel to the surface, wherein movement of the cutting tool along the trajectory during the relative motion between the cutting tool and the surface is configured to cut grooves having variable depth and variable pitch into the surface.

2. The system of claim 1, wherein:
the surface is cylindrical; and
the drive mechanism is configured to provide the relative motion between the cutting tool and the surface by rotating the cylindrical surface.

3. The system of claim 1, further comprising a controller configured to generate a signal to produce non-random, random, or pseudo-random movement of the cutting tool.

4. The system of claim 1, wherein the trajectory has an angle in a range of about 1 degree to about 89 degrees or in a range of about 91 degrees to about 179 degrees relative to the plane of the surface.

5. The system of claim 1, wherein the variation in pitch is about 0.5 microns to about 50 microns with a wavelength of about 5 microns to about 500 microns.

6. The system of claim 1, wherein the variation in depth is about 0.5 microns to about 50 microns with a wavelength of about 5 microns to about 500 microns.

7. The system of claim 1, wherein the drive mechanism is configured to move the cutting tool to produce a low frequency variation in groove pitch of about 0.5 microns to about 50 microns with a wavelength of about 500,000 microns, the low frequency variation in pitch superimposed on the variation caused by the movement of the cutting tool along the trajectory.

8. The system of claim 1, wherein the drive mechanism is configured to move the cutting tool to produce a low frequency variation in groove depth of about 0.5 microns to about 50 microns with a wavelength of about 2,000,000 microns, the low frequency variation in depth superimposed on the variation caused by the movement of the cutting tool along the trajectory.

9. The system of claim 1, wherein the actuator comprises one single axis piezoelectric actuator oriented with respect to the surface so that a direction of operation of the actuator is along the trajectory.

10. The system of claim 1, wherein the x and z components of the trajectory are adjustable.

11. The system of claim 1, further comprising a mechanism configured to orient the cutting tool tip geometry substantially perpendicular to the surface.

12. The system of claim 11, wherein the mechanism comprises a spacer disposed between the actuator and the cutting tool.

13. The system of claim 1, wherein the cutting tool is oriented at an angle, $\theta$, with respect to the surface.

* * * * *